(12) United States Patent
So et al.

(10) Patent No.: US 10,410,275 B2
(45) Date of Patent: Sep. 10, 2019

(54) SYSTEM AND METHODS FOR INTEGRATED PURCHASE MANAGEMENT SERVICE

(71) Applicant: SK PLANET CO., LTD., Seongnam-si, Gyeonggi-do (KR)

(72) Inventors: Koung Suk So, Seongnam-si (KR); Eun Su Jeong, Gwacheon-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 299 days.

(21) Appl. No.: 14/751,853

(22) Filed: Jun. 26, 2015

(65) Prior Publication Data
US 2016/0005101 A1 Jan. 7, 2016

(30) Foreign Application Priority Data
Jul. 3, 2014 (KR) .......... 10-2014-0083069

(51) Int. Cl.
*G06Q 30/06* (2012.01)
*G06Q 30/02* (2012.01)
*G06Q 20/38* (2012.01)

(52) U.S. Cl.
CPC ....... *G06Q 30/0633* (2013.01); *G06Q 20/387* (2013.01); *G06Q 30/0222* (2013.01)

(58) Field of Classification Search
CPC ........... G06Q 30/0633; G06Q 30/0222; G06Q 20/387
USPC ............................ 705/26.1, 26.8, 14.1, 14.3
See application file for complete search history.

(56) References Cited

U.S. PATENT DOCUMENTS

| 8,265,991 B1 * | 9/2012 | Leffert | G06Q 30/02 705/14.13 |
| 9,189,811 B1 * | 11/2015 | Bhosle | G06Q 30/0631 |
| 2012/0259690 A1 * | 10/2012 | Bennett | G06Q 30/0207 705/14.23 |

(Continued)

FOREIGN PATENT DOCUMENTS

KR    1020080020152 A    3/2008

OTHER PUBLICATIONS

Masterson, Michele—Associate Editor, E-Commerce Guide, "BuyWiz Unveils Universal Shopping Cart", article published on Aug. 23, 1999, extracted from the site: www.internet.com.*

*Primary Examiner* — Yogesh C Garg
(74) *Attorney, Agent, or Firm* — Brinks Gilson & Lione

(57) ABSTRACT

An integrated purchase management apparatus includes a wish list collection unit for collecting a wish list including product information from at least one product selling apparatus, an integrated wish list generation unit for generating the integrated wish list of a corresponding user and storing the generated integrated wish list, an integrated wish list provision unit for obtaining additional payment means that belongs to additional payment means and transmitting integrated wish list information including the obtained additional payment means and the integrated wish list to the terminal device of the user, and a settlement processing unit for applying additional payment means corresponding to additional payment means selection information to a settlement request amount and performing settlement on the remaining amount using payment means, when a settlement request signal including the additional payment means selection information and the payment means is received.

5 Claims, 5 Drawing Sheets

(56) References Cited

U.S. PATENT DOCUMENTS

| | | | |
|---|---|---|---|
| 2013/0097079 A1* | 4/2013 | Bruder | G06Q 20/425 705/44 |
| 2013/0214935 A1* | 8/2013 | Kim | H04L 12/2816 340/870.02 |
| 2015/0032507 A1* | 1/2015 | Narasimhan | G06Q 30/02 705/7.31 |
| 2015/0032529 A1* | 1/2015 | Diachenko | G06Q 30/02 705/14.27 |

* cited by examiner

SYSTEM AND METHODS FOR INTEGRATED PURCHASE MANAGEMENT SERVICE

CROSS REFERENCE TO RELATED APPLICATION

The present application claims the benefit of Korean Patent Application No. 10-2014-0083069 filed in the Korean Intellectual Property Office on Jul. 3, 2014, the entire contents of which are incorporated herein by reference.

BACKGROUND OF THE INVENTION

1. Technical Field

The present invention relates to a system and methods for an integrated purchase management service and, more particularly, to a system and methods for an integrated purchase management service, which provide a discount service through one payment in such a manner that a single integrated purchase management apparatus collects products to be purchased from various online shopping malls and automatically provides notification of additional payment means that belong to additional payment means owned by a user and that are applicable to the products.

2. Description of the Related Art

In general, an online shopping mall provides users with only product information about products that are sold in its web site. If a user registers a product as an interest product prior to the purchase of the product, the online shopping mall provides a wish list service or shopping basket service (hereinafter called a 'wish list service') that produces and manages a wish list including product information about the interest product of the user.

Such conventional online shopping malls independently manage their web sites. Accordingly, if a user wants to check or purchase product information about a product previously registered as an interest product again, the user has to access a corresponding online shopping mall, perform login, and search his or her wish list for the corresponding product.

Accordingly, in accordance with a wish list service provided by the conventional online shopping mall, if products to be checked or purchased by a user are distributed to several online shopping malls, a user has to perform many repetitive actions, and the time taken for such repetitive actions is wasted. Furthermore, if a user has lost the access address of an online shopping mall with which an interest product has been registered, the user is unable to check the interest product again. As a result, there is a problem in that a user has to repeat excessive efforts although product information already searched for is present or cannot properly use the product information. Furthermore, there is a problem in that from a viewpoint of the operator of an online shopping mall, a sale is reduced because a user gives up purchase attributable to inconvenience.

Furthermore, as the number of users who purchase products in various online shopping malls is increased, a user has to inconveniently pay for products in an individual online shopping mall individually.

PRIOR ART DOCUMENT

Patent Document (Patent Document 1) Prior Art 1: Korean Patent Application Publication No. 10-2008-0020152 entitled "System and Method for the Internet Shopping by Automatically Selecting a Purchase Item via a Mobile Phone"

SUMMARY OF THE INVENTION

Accordingly, the present invention has been made keeping in mind the above problems occurring in the prior art, and an object of the present invention is to collect products to be purchased in various online shopping malls through a single integrated purchase management apparatus and enable settlement to be performed at a time.

Another object of the present invention is to automatically provide notification of additional payment means that belong to additional payment means, such as membership points and coupons owned by a user, and that are applicable to corresponding products and to provide a discount through the additional payment means, if the products to be purchased in various online shopping malls are to be collected and settlement is to be performed at a time.

In accordance with an aspect of the present invention, there is provided an integrated purchase management apparatus, including a wish list collection unit configured to collect a wish list including product information from at least one product selling apparatus, an integrated wish list generation unit configured to generate the integrated wish list of a corresponding user based on user information corresponding to the collected wish list and to store the generated integrated wish list, an integrated wish list provision unit configured to obtain additional payment means that belongs to additional payment means owned by the user and that is applicable to each of products included in the generated integrated wish list and to transmit integrated wish list information including the obtained additional payment means and the integrated wish list to the terminal device of the user, and a settlement processing unit configured to apply additional payment means corresponding to additional payment means selection information to a settlement request amount and to perform settlement on the remaining amount using payment means, when a settlement request signal including the additional payment means selection information and the payment means is received.

The integrated purchase management apparatus may further include an authentication unit configured to perform user authentication based on previously stored user information when login information is received from the terminal device.

The integrated wish list provision unit may perform a discount in advance by applying the obtained additional payment means to a corresponding product, may calculate an amount left after the discount as a settlement request amount, and may transmit integrated wish list information including the calculated settlement request amount and the integrated wish list to the terminal device.

When any one product of product items included in the integrated wish list is selected and partial settlement is requested by the terminal device, the settlement processing unit may provide the terminal device with a partial settlement menu that induces a partial settlement amount of the selected product to be selected and partial settlement to be performed and may perform partial settlement processing on the partial settlement amount when an execution of the partial settlement is requested through the partial settlement menu.

In accordance with another aspect of the present invention, there is provided a system for integrated purchase management service, including at least one product selling apparatus configured to generate a wish list including product information about at least one product selected by a user who wants to purchase the product in accordance with user information and to transmit the generated wish list to an integrated purchase management apparatus, an integrated purchase management apparatus configured to generate the integrated wish list of the user based on the user information that is provided by the at least one product selling apparatus and that corresponds to the wish list, obtain additional payment means applicable to each of products included in the generated integrated wish list, and transmit the obtained additional payment means to the terminal device of the user along with the integrated wish list, and the terminal device configured to display integrated wish list information including the integrated wish list and the additional payment means provided by the integrated purchase management apparatus.

When additional payment means to be used is selected in the integrated wish list information and payment means information is received, the terminal device may transmit a settlement request signal including the selected additional payment means and the payment means information to the integrated purchase management apparatus. The integrated purchase management apparatus may apply the selected additional payment means to the settlement amount of the integrated wish list and perform settlement on the remaining amount using the payment means.

The integrated purchase management apparatus may perform a discount in advance by applying the obtained additional payment means to a corresponding product, may calculate an amount left after the discount as a settlement request amount, may transmit integrated wish list information including the calculated settlement request amount and the integrated wish list to the terminal device, and may perform settlement using payment means corresponding to payment means information when a settlement request signal including the payment means information is received from the terminal device.

In accordance with yet another aspect of the present invention, there is provided a method for providing, by an integrated purchase management apparatus, an integrated purchase management service, including collecting a wish list including product information from at least one product selling apparatus, generating the integrated wish list of a corresponding user based on user information corresponding to the collected wish list, obtaining additional payment means that belongs to additional payment means owned by the user and that is applicable to each of products included in the generated integrated wish list and transmitting integrated wish list information including the obtained additional payment means and the integrated wish list to the terminal device of the user, and applying additional payment means corresponding to additional payment means selection information to a settlement request amount of the integrated wish list and performing settlement on the remaining amount using the payment means, when a settlement request signal including the additional payment means selection information and the payment means is received from the terminal device.

In accordance with further yet another aspect of the present invention, there is provided a computer-readable recording medium on which a program for executing a method for an integrated purchase management service has been recorded. The method includes collecting a wish list including product information from at least one product selling apparatus when the method is executed by an integrated purchase management apparatus, generating the integrated wish list of a corresponding user based on user information corresponding to the collected wish list, obtaining additional payment means that belongs to additional payment means owned by the user and that is applicable to each of products included in the generated integrated wish list and transmitting integrated wish list information including the obtained additional payment means and the integrated wish list to the terminal device of the user, and applying additional payment means corresponding to additional payment means selection information to a settlement request amount of the integrated wish list and performing settlement on the remaining amount using the payment means, when a settlement request signal including the additional payment means selection information and the payment means is received from the terminal device.

In accordance with further yet another aspect of the present invention, there is provided a method for integrated purchase management service, including transmitting, by at least one product selling apparatus, a wish list including information about at least one product selected by a user who wants to purchase the product to an integrated purchase management apparatus, generating, by the integrated purchase management apparatus, the integrated wish list of the user based on user information corresponding to the wish list provided by the at least one product selling apparatus, obtaining, by the integrated purchase management apparatus, additional payment means that belongs to additional payment means owned by the user and that is applicable to each of products included in the generated integrated wish list and transmitting integrated wish list information including the obtained additional payment means and the integrated wish list to the terminal device of the user, transmitting, by the terminal device, a settlement request signal including selected additional payment means and payment means information to the integrated purchase management apparatus when the additional payment means to be used is selected in the integrated wish list information and the payment means information is received, and applying, by the integrated purchase management apparatus, the selected additional payment means to a settlement request amount of the integrated wish list and performing settlement on the remaining amount using the payment means.

DETAILED DESCRIPTION

The details of the objects and technical configurations of the present invention and corresponding acting effects will become more clearly understood from the following detailed description based on the drawings accompanied by the specification of the present invention.

Hereinafter, a system and methods for an integrated purchase management service in accordance with embodiments of the present invention are described in detail with reference to the accompanying drawings. Embodiments to be described herein are provided in order for those skilled in the art to easily understand the technical spirit of the present invention, and the present invention is not limited to the embodiments. Furthermore, contents represented in the accompanying drawings have been diagrammed in order to easily describe the embodiments of the present invention, and the contents may be different from forms that are actually implemented.

Each of the elements represented herein is only an example for implementing the embodiments of the present invention. Accordingly, in other implementations of the present invention, different elements may be used without departing from the spirit and scope of the present invention. Furthermore, each element may be purely formed of a hardware or software element, but may also be implemented using a combination of various hardware and software elements that perform the same function. Furthermore, two or more elements may be implemented using a single piece of hardware or software.

Furthermore, an expression that some elements are "included" is an expression of an "open type", and the expression simply denotes that the corresponding elements are present, but it should not be understood that additional elements are excluded.

Figure 1:
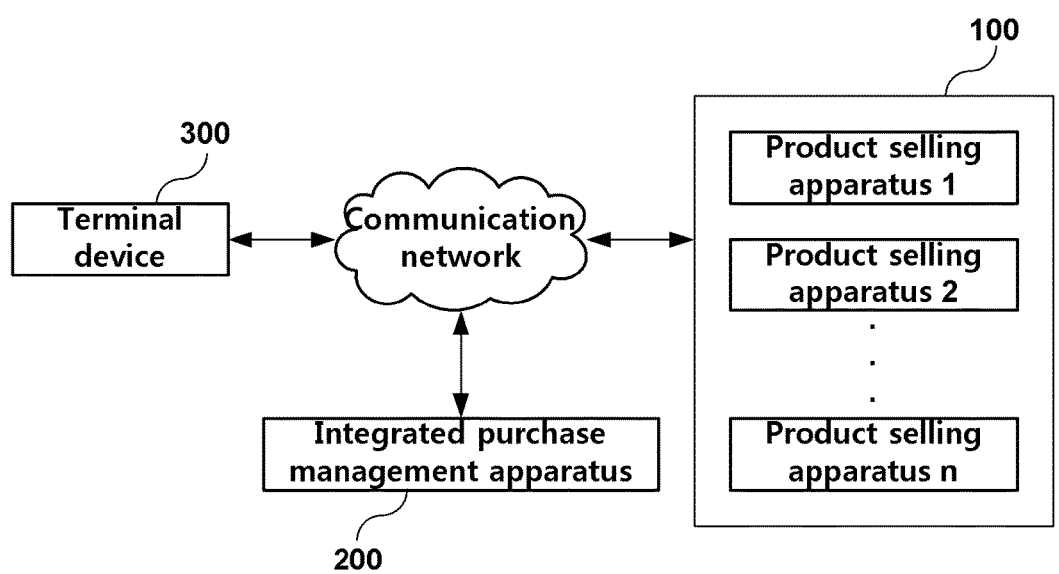
FIG. 1 is a diagram illustrating a system for an integrated purchase management service in accordance with an embodiment of the present invention.

FIG. 1 is a diagram illustrating a system for an integrated purchase management service in accordance with an embodiment of the present invention.

Referring to FIG. 1, the system for an integrated purchase management service includes at least one product selling apparatus 100, an integrated purchase management apparatus 200, and a terminal device 300, which may transmit and receive data over a communication network.

The at least one product selling apparatus 100 stores user information registered by a user who has joined a corresponding online shopping mall, generates a wish list, including product information about at least one product selected by the user who wants to purchase the product, in accordance with corresponding user information, and transmits the generated wish list to the integrated purchase management apparatus 200. In this case, the product selling apparatus 100 transmits user identification information and product selling apparatus identification information, together with the wish list, to the integrated purchase management apparatus 200. The user identification information is used to identify the user, and may include a name, login key information, and a telephone number. Furthermore, the product information included in the wish list may include a product name and price, information about a product selling apparatus that sells products (e.g., the name and access information of the product selling apparatus), a product image, and benefit information. The benefit information may include a membership mileage and coupons applied to a corresponding product.

The product selling apparatus 100 generates a wish list, including information about at least one product selected by a user who has accessed the product selling apparatus 100 over a communication network and has logged in thereto, in accordance with corresponding user information and stores the generated wish list. Accordingly, the product selling apparatus 100 stores and manages a wish list corresponding to user information about each of all the subscribers. Such a function may be the same as or may correspond to a wish list service provided by an existing online shopping mall.

Furthermore, when a log-in user additionally selects an interest product or deletes a previously registered interest product, the product selling apparatus 100 changes a wish list corresponding to user information about the corresponding user. If a wish list is changed as described above, the product selling apparatus 100 may provide the changed wish list to the integrated purchase management apparatus 200 in accordance with corresponding user information.

The at least one product selling apparatus 100 which has entered into a partnership with the integrated purchase management apparatus 200 stores the wish lists of subscribers managed by its own shopping mall and also provides the wish lists to the external integrated purchase management apparatus 200.

When a product purchase completion signal including information about a product that has been paid is received from the integrated purchase management apparatus 200, the product selling apparatus 100 deletes the corresponding product from the wish list of a corresponding user. In this case, the product purchase completion signal may include the name of the product that has been paid and user identification information.

The product selling apparatus 100 may correspond to a server managed by an online shopping mall which has entered a partnership with the integrated purchase management apparatus 200, may communicate with other electronic devices in accordance with various communication standards, and may be implemented through electronic devices capable of performing a variety of types of data processing operation.

The integrated purchase management apparatus 200 collects a wish list provided by the at least one product selling apparatus 100, and generates the integrated wish list of a corresponding user based on user identification information included in the collected wish list. In this case, the integrated purchase management apparatus 200 may generate the integrated wish list by matching identification information about the at least one product selling apparatus 100 with corresponding product information. That is, the integrated purchase management apparatus 200 generates the integrated wish list by integrating pieces of product information included in wish lists collected by different product selling apparatuses 100, and stores the generated integrated wish list in accordance with the user identification information. If an integrated wish list corresponding to user identification information has been previously generated and stored, the integrated purchase management apparatus 200 updates the corresponding integrated wish list with the product information of a collected wish list. Accordingly, the integrated purchase management apparatus 200 may generate and manage an integrated wish list based on user information about each of users who have joined an online integrated shopping service provided by the integrated purchase management apparatus 200.

When an authenticated terminal device is connected, the integrated purchase management apparatus 200 obtains an integrated wish list corresponding to corresponding user identification information and additional payment means applicable to each of the products of the integrated wish list and transmits the obtained integrated wish list to the terminal device 300. In this case, the additional payment means may include membership points and coupons.

In this case, the integrated purchase management apparatus 200 transmits integrated wish list information, including the integrated wish list, the applicable additional payment means, and a settlement request amount, to the terminal device 300. Furthermore, the integrated purchase management apparatus 200 may transmit the integrated wish list information, including an amount that has been discounted in advance by previously applying additional payment means applicable to each of the products of the integrated wish list as a settlement request amount, to the terminal device 300.

Accordingly, the integrated purchase management apparatus 200 integrates and manages wish lists, collected from the at least one product selling apparatus 100, as the integrated wish list of each user. When a user logs in to the integrated purchase management apparatus 200, the integrated purchase management apparatus 200 provides a web page, including the integrated wish list of the corresponding user, to the corresponding terminal device 300 of the user. Accordingly, when a user who has joined an online integrated shopping service logs in to the integrated purchase management apparatus 200, the user can conveniently check the interest products of other online shopping malls because the user can check wish lists registered with other online shopping malls at a look. Accordingly, when a user tries to check or purchase an interest product that has been previously searched for and registered with a wish list, the user can check the corresponding interest product conveniently and rapidly although the user has forgotten the access address of a corresponding online shopping mall in which the corresponding interest product is sold.

When a settlement request signal including additional payment means selection information and payment means information is received from the terminal device 300, the integrated purchase management apparatus 200 applies selected additional payment means to a settlement request amount and pay the remaining amount using the payment means. In this case, the payment means may include a credit card, a mobile phone, and a check card.

Furthermore, when one product is selected from product items included in an integrated wish list and partial settlement is requested by the log-in terminal device 300, the integrated purchase management apparatus 200 selects the partial settlement amount of the selected product and provides the terminal device 300 with a partial settlement menu that induces a corresponding user to perform the partial settlement. Furthermore, when the partial settlement amount of a corresponding product is selected and the execution of the partial settlement is requested by the terminal device 300 through the partial settlement menu, the integrated purchase management apparatus 200 performs partial settlement processing on the partial settlement amount and stores and manages the payment history of the corresponding product.

The integrated purchase management apparatus 200 may communicate with other electronic devices in accordance with various communication standards, and may be implemented using an electronic device capable of performing a variety of types of data processing operation. For example, the integrated purchase management apparatus 200 may be implemented in the form of a server apparatus and may be implemented in the form of various electronic devices in addition to a server apparatus form. Furthermore, the integrated purchase management apparatus 200 may be implemented in the form of a single electronic device or may be implemented in a form in which two or more electronic devices have been combined.

The integrated purchase management apparatus 200 will be described in detail later with reference to FIG. 2.

The terminal device 300 accesses the integrated purchase management apparatus 200 over a communication network in response to a user input, logs in to the integrated purchase management apparatus 200, and displays integrated wish list information including an integrated wish list and additional payment means provided by the integrated purchase management apparatus 200. The integrated wish list information may include product information, additional payment means, and a settlement request amount for products included in the integrated wish list.

When additional payment means is selected from the integrated wish list information and payment means information is inputted, the terminal device 300 transmits a settlement request signal, including the selected additional payment means and the payment means information, to the integrated purchase management apparatus 200.

The terminal device 300 refers to a terminal capable of transmitting and receiving various data over a communication network in response to a key manipulation from a user. The terminal device 300 may be any one of a tablet PC, a laptop, a personal computer (PC), a smart phone, a personal digital assistant (PDA), and a mobile communication terminal.

Figure 2:
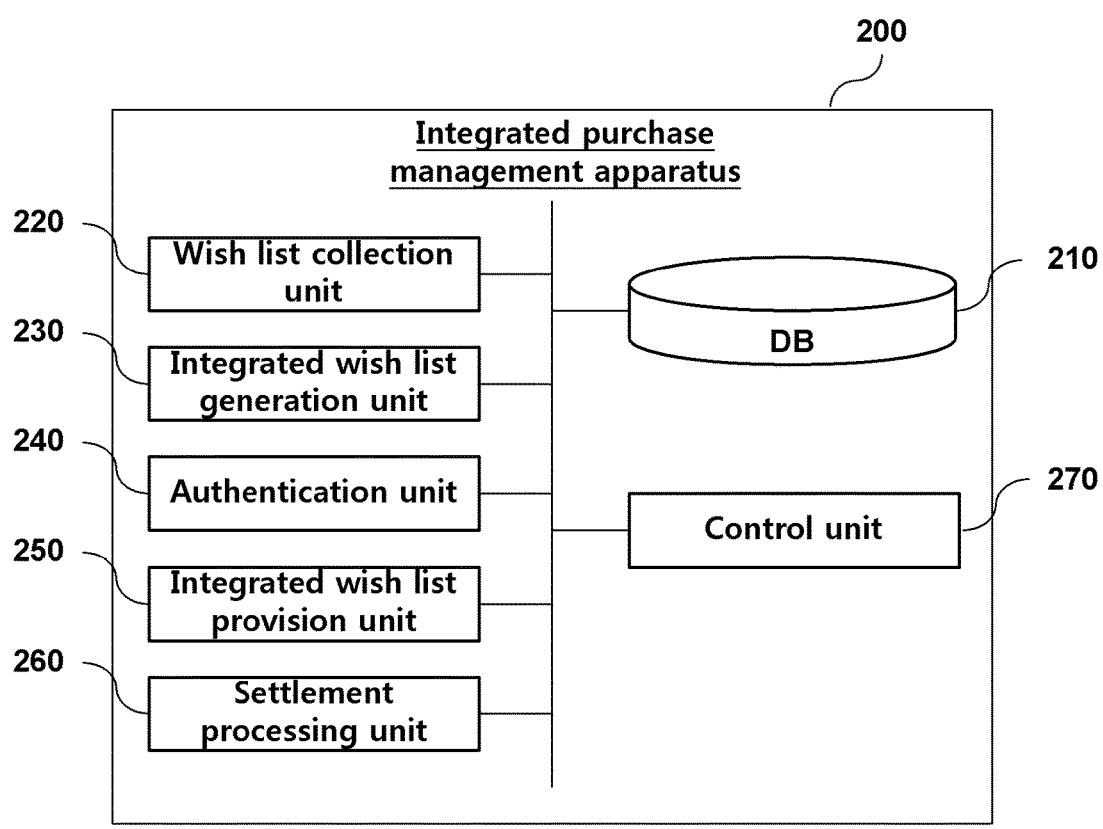
FIG. 2 is a block diagram schematically illustrating the configuration of an integrated purchase management apparatus in accordance with an embodiment of the present invention.

FIG. 2 is a block diagram schematically illustrating the configuration of the integrated purchase management apparatus 200 in accordance with an embodiment of the present invention.

Referring to FIG. 2, the integrated purchase management apparatus 200 includes a database (DB) 210, a wish list collection unit 220, an integrated wish list generation unit 230, an authentication unit 240, an integrated wish list provision unit 250, a settlement processing unit 260, and a control unit 270.

The database 210 stores user information and additional payment means and an integrated wish list owned by each of users. In this case, the user information may include the name, login information, age, occupation, address, and contact information of a user. The additional payment means may include membership points and coupons. The integrated wish list is product information in which pieces of product information included in wish lists collected from various selling management apparatuses have been integrated into one, and may include product items corresponding to respective products that have been selected by a user who wants to purchase the products and that have been registered as interest products. A product item corresponding to each product may include the name of the corresponding product, information about a product selling apparatus that sells the corresponding product, a registration date when the corresponding product was registered as an interest product, and the price and image of the corresponding product.

The wish list collection unit 220 collects wish lists including product information from external product selling apparatuses. The wish list collection unit 220 collects a wish list, including information about products selected to be purchased by each user, from at least one product selling apparatus and provides the collected wish list to the integrated wish list generation unit 230. In this case, the product information of the wish list is information about a product that has been registered with the wish list as an interest product, and may include the name and price of the corresponding product, information about a product selling apparatus that sells the product, and a product image of the corresponding product.

The integrated wish list generation unit 230 generates the integrated wish list of a corresponding user based on user identification information corresponding to wish lists collected by the wish list collection unit 220, matches the generated integrated wish list with the user identification information, and stores the matched results in the database 210. That is, the integrated wish list generation unit 230 generates an integrated wish list by integrating pieces of product information corresponding to wish lists collected from different product selling apparatuses for each user, and stores the generated integrated wish list in the database 210 in accordance with user identification information. In this case, if an integrated wish list corresponding to user identification information has already been generated and stored, the integrated wish list generation unit 230 may update the integrated wish list with product information included in a currently collected wish list and store the updated integrated wish list.

When login information is received from the terminal device 300, the authentication unit 240 performs user authentication based on user information stored in the database 210. That is, when a user attempts login through his or her terminal device, the authentication unit 240 searches the database 210 for corresponding user information based on login information (e.g., an ID or a telephone) received along with the login attempt and performs authentication by comparing a password, received from the terminal device, with password information for the user information.

When an authenticated terminal device accesses the integrated wish list provision unit 250, the integrated wish list provision unit 250 searches the database 210 for an integrated wish list corresponding to corresponding user information, obtains additional payment means applicable to each of products, included in the retrieved integrated wish list, from the database 210, and transmits integrated wish list information, including the obtained additional payment means and the integrated wish list, to the authenticated terminal device.

That is, when an authenticated terminal device accesses the integrated wish list provision unit 250, the integrated wish list provision unit 250 searches the database 210 for an integrated wish list corresponding to user identification information. Thereafter, the integrated wish list provision unit 250 extracts additional payment means, corresponding to the user identification information, from the database 210, and obtains additional payment means that belongs to the extracted additional payment means and that is applicable to products included in the retrieved integrated wish list.

Thereafter, the integrated wish list provision unit 250 transmits integrated wish list information, including the applicable additional payment means and the integrated wish list, to the authenticated terminal device. In this case, the integrated wish list information may include a settlement request amount, that is, the sum of the prices of the products included in the integrated wish list. Furthermore, the integrated wish list provision unit 250 may perform a discount in advance by applying the applicable additional payment means to corresponding products, may calculate a settlement amount left after the discount as a settlement request amount, and may transmit integrated wish list information, including the calculated settlement request amount and the integrated wish list, to the authenticated terminal device. In this case, the integrated wish list provision unit 250 may display the products to which the discount has been applied and the corresponding additional payment means.

Accordingly, when a user who has joined an online integrated shopping service logs in to the integrated purchase management apparatus 200 through a terminal device, the user can conveniently check the interest products of other online shopping malls that have been registered by the user because the user can check wish lists registered with other online shopping malls at a look.

In accordance with another embodiment of the present invention, when an integrated wish list is updated by the integrated wish list generation unit 240, the integrated wish list provision unit 250 extracts the additional payment means of a corresponding user from the database 210 and obtains additional payment means that belongs to the extracted additional payment means and that is applicable to products included in the generated integrated wish list. Thereafter, the integrated wish list provision unit 250 may transmit integrated wish list information, including the obtained additional payment means and the integrated wish list, to the terminal device of the corresponding user. In the present embodiment, the integrated wish list provision unit 250 may perform a discount in advance by applying applicable additional payment means to a corresponding product, and may transmit integrated wish list information, including a settlement amount left after the discount and an integrated wish list, to the terminal device.

When a settlement request signal including additional payment means selection information and payment means information is received from the terminal device, the settlement processing unit 260 applies additional payment means, corresponding to the additional payment means selection information, to a settlement request amount, performs settlement on the remaining amount using the payment means, transmits a settlement completion signal to the terminal device when the settlement is completed, and transmits a product purchase completion signal to a corresponding product selling apparatus. The settlement processing unit 260 stores and manages a settlement history in accordance with each of products included in the integrated wish list stored for each piece of user information.

When one product is selected from product items included in an integrated wish list and partial settlement is requested by the terminal device, the settlement processing unit 260 may select the partial settlement amount of the selected product, may provide the terminal device with a partial settlement menu that induces a corresponding user to perform partial settlement, and may perform partial settlement processing on the partial settlement amount when the execution of the partial settlement is requested through the execution of the partial settlement menu.

In this case, the partial settlement menu may include an input window that induces a corresponding user to input information about a partial settlement amount to be paid when a selected product is to be partially paid and information about a payer who will pay the partial settlement amount (e.g., a payer name, a payment method, and settlement authentication information). Accordingly, when information about a partial settlement amount and a payer is inputted through the partial settlement menu and the execution of partial settlement is requested by the terminal device, the settlement processing unit 260 processes settlement on the partial settlement amount of a corresponding product. Thereafter, the settlement processing unit 260 stores and manages the payment history of the corresponding product according to the partial settlement. The stored payment history may include product information corresponding to the partially paid product, information about a partial settlement amount accumulated in accordance with the corresponding product, information about the payer who paid the amount, and a payment date.

When the payment history is stored, the settlement processing unit 260 may provide a brief payment history of the recent partial settlement to a user, corresponding to a corresponding integrated wish list, in a message form.

Each of the wish list collection unit 220, the integrated wish list generation unit 230, the authentication unit 240, the integrated wish list provision unit 250, and the settlement processing unit 260 may be implemented by a processor for executing a program on a computing apparatus. As described above, the wish list collection unit 220, the integrated wish list generation unit 230, the authentication unit 240, the integrated wish list provision unit 250, and the settlement processing unit 260 may be implemented by physically independent elements or may be implemented in such a way as to be functionally divided within a single processor.

The control unit 270 controls the operations of various elements of the integrated purchase management apparatus 200, including the database 210, the wish list collection unit 220, the integrated wish list generation unit 230, the authentication unit 240, the integrated wish list provision unit 250, and the settlement processing unit 260.

The control unit 270 may include at least one operation apparatus. The operation apparatus may be a general-purpose central processing unit (CPU), a programmable device (CPLD or FPGA) suitably implemented for a specific purpose, an application-specific integrated circuit (ASIC), or a microcontroller chip.

The aforementioned elements that may be included in the integrated purchase management apparatus 200 may be implemented using hardware, software or a combination of them. Two or more of the aforementioned elements may be implemented using a single piece of hardware or software.

Figure 3:
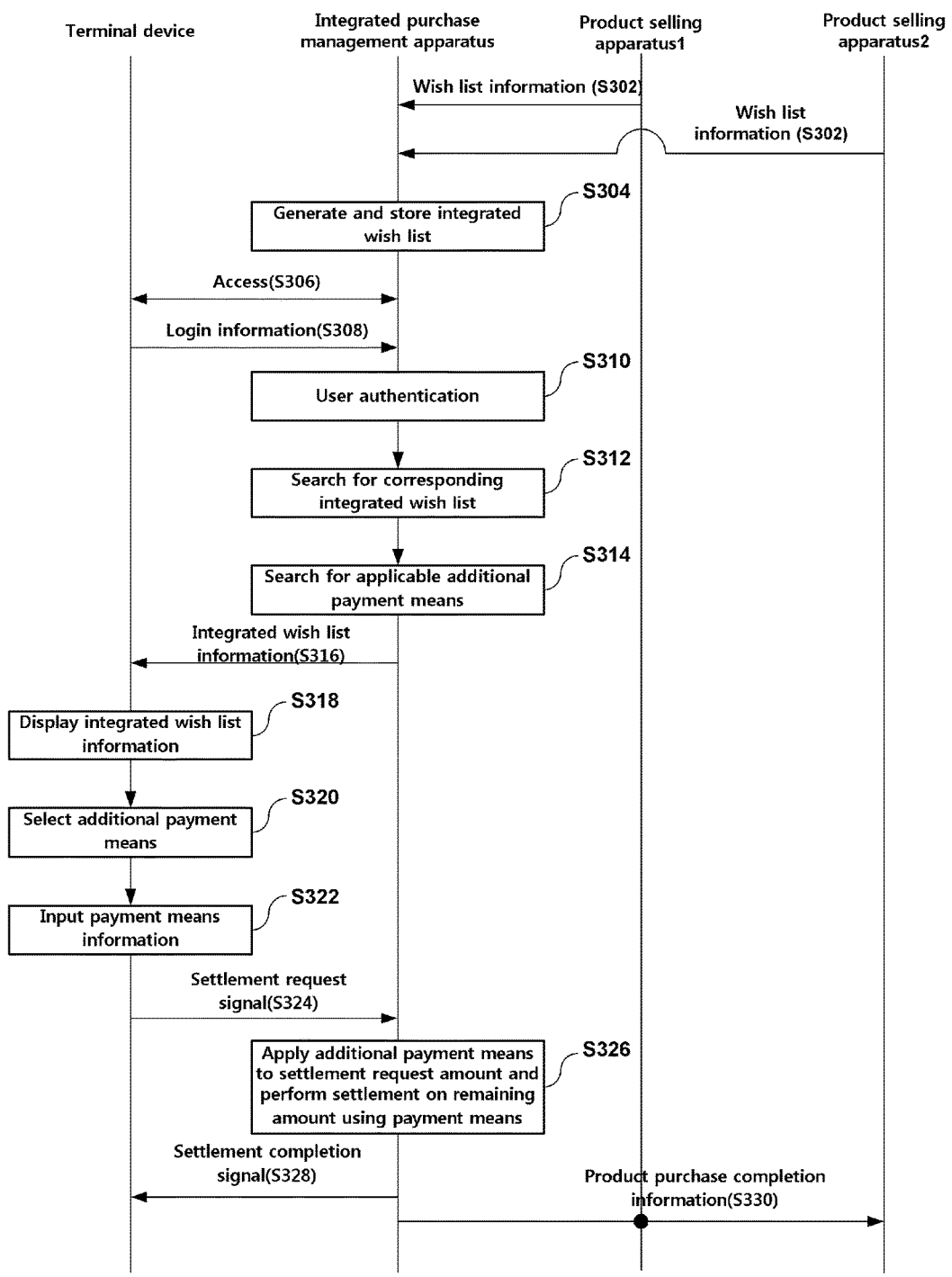
FIGS. 3 to 5 are diagrams illustrating methods for an integrated purchase management service in accordance with embodiments of the present invention.

FIG. 3 is a diagram illustrating a method for an integrated purchase management service in accordance with an embodiment of the present invention.

Referring to FIG. 3, product selling apparatuses transmit wish lists in which purchase request or interest products have been registered by users to the integrated purchase management apparatus 200 at step S302. The product selling apparatuses may transmit the wish lists along with user identification information. The user identification information may include terminal device identification information and a user ID.

The integrated purchase management apparatus 200 sorts the wish lists, collected from the product selling apparatuses, for each piece of user identification information, generates the integrated wish list of each user, and stores the generated integrated wish lists at step S304.

Thereafter, when a user accesses the integrated purchase management apparatus 200 through a terminal device at step S306 and inputs login information, the terminal device transmits the login information to the integrated purchase management apparatus 200 at step S308.

The integrated purchase management apparatus 200 performs user authentication by comparing the received login information with previously registered login information at step S310, and searches for an integrated wish list corresponding to corresponding user identification information if, as a result of the comparison, the user is found to be an authenticated user at step S312.

Thereafter, the integrated purchase management apparatus 200 searches for additional payment means that belongs to additional payment means owned by the user and that is applicable to each of products included in the integrated wish list at step S314, and transmits integrated wish list information, including the retrieved additional payment means and the integrated wish list, to the terminal device at step S316.

The terminal device displays the integrated wish list information at step S318. When the user selects additional payment means to be used from the additional payment means at step S320 and inputs payment means information at step S322, the terminal device transmits a settlement request signal, including the additional payment means to be used and the payment means information, to the integrated purchase management apparatus 200 at step S324.

The integrated purchase management apparatus 200 performs a discount in advance by applying the additional payment means to a settlement request amount and performs settlement on the remaining amount using the payment means at step S326.

When the settlement is completed, the integrated purchase management apparatus 200 transmits a settlement completion signal to the terminal device at step S328 and transmits product purchase completion information to a corresponding product selling apparatus at step S330.

Figure 4:
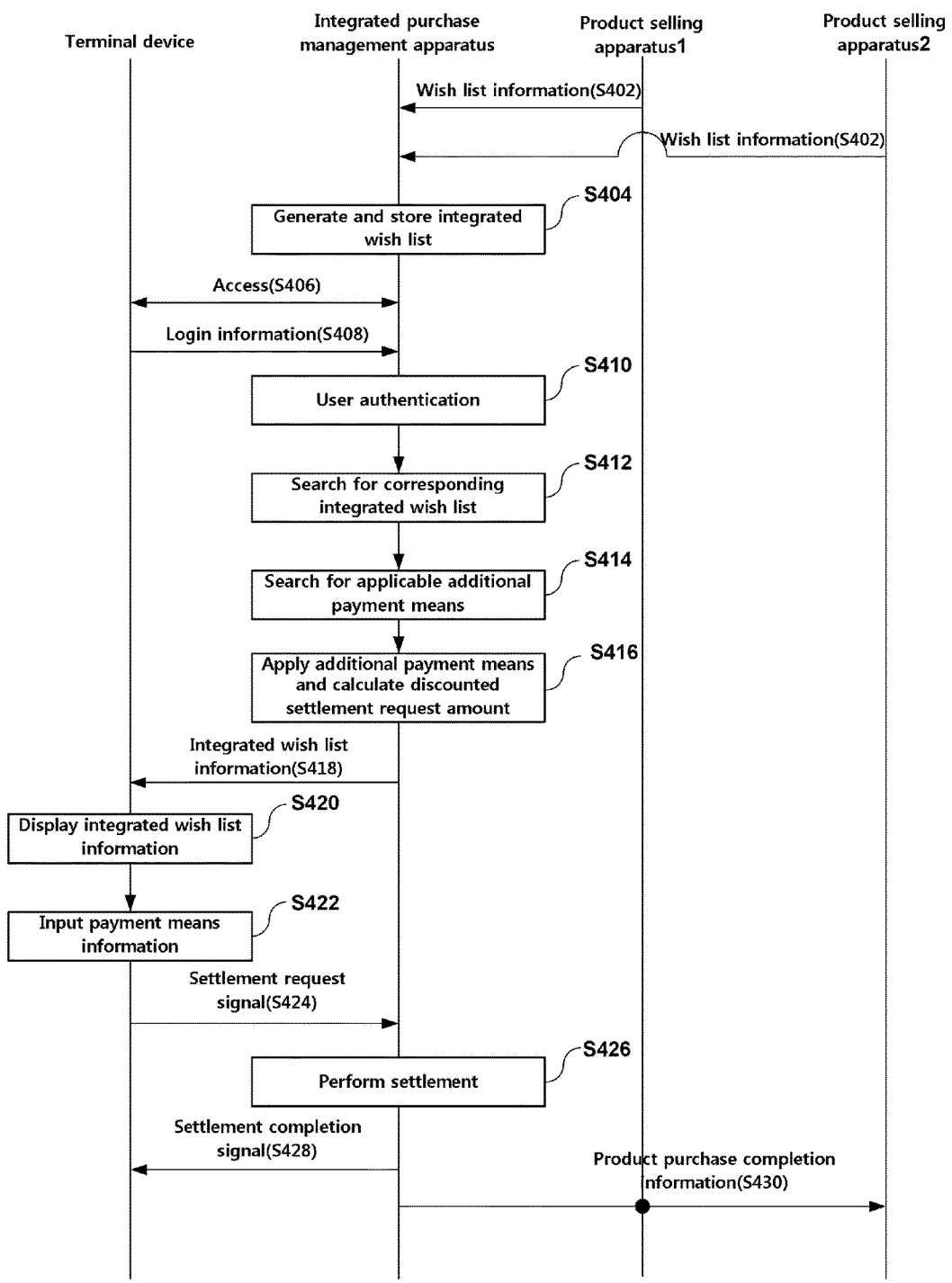

FIG. 4 is a diagram illustrating a method for an integrated purchase management service in accordance with another embodiment of the present embodiment.

Referring to FIG. 4, steps S402 to S414 are the same as steps S302 to S314 of FIG. 3, and thus a description thereof is omitted.

When step S414 is performed, the integrated purchase management apparatus 200 applies the additional payment means to a settlement request amount and calculates a settlement request amount that has been discounted by performing a discount in advance at step S416, and transmits integrated wish list information, including the calculated settlement request amount, the integrated wish list, the additional payment means, and products to which the additional payment means has been applied, to the terminal device at step S418.

The terminal device displays the integrated wish list information at step S420. When a user inputs payment means information at step S422, the terminal device transmits a settlement request signal, including the payment means information, to the integrated purchase management apparatus 200 at step S424.

The integrated purchase management apparatus 200 performs settlement using the payment means at step S426, transmits a settlement completion signal to the terminal device at step S428, and transmits product purchase completion information to a corresponding product selling apparatus at step S430.

Figure 5:
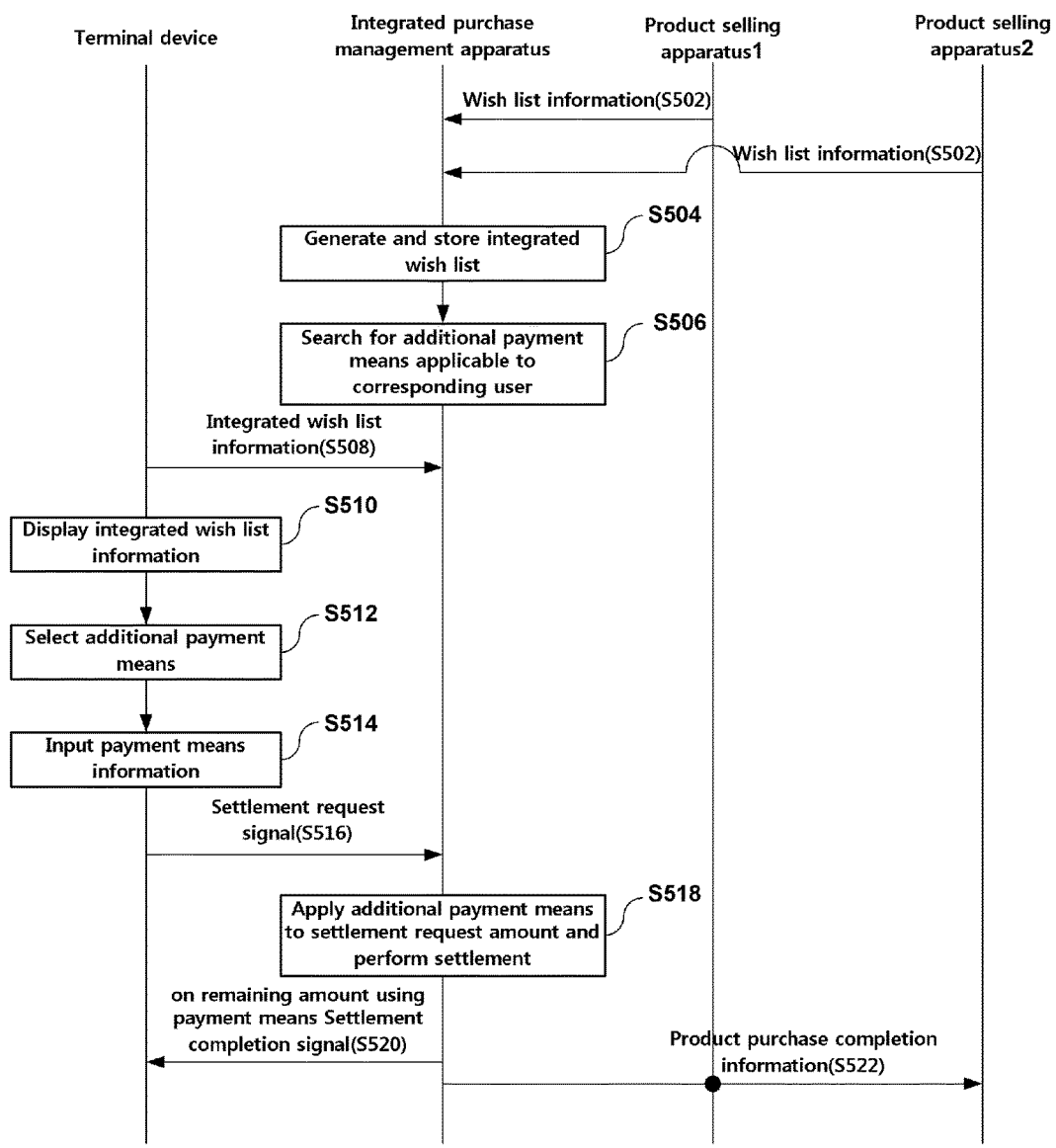

FIG. 5 is a diagram illustrating a method for an integrated purchase management service in accordance with yet another embodiment of the present embodiment.

Referring to FIG. 5, the product selling apparatuses transmits wish lists in which purchase request or interest products have been registered by users to the integrated purchase management apparatus 200 at step S502. The product selling apparatuses may transmit the wish lists along with user identification information.

The integrated purchase management apparatus 200 sorts the wish lists, collected from the product selling apparatuses, for each piece of user identification information, generates the integrated wish list of each user, and stores the generated integrated wish lists at step S504. Thereafter, the integrated purchase management apparatus 200 searches additional payment means that belongs to additional payment means owned by a corresponding user and that is applicable to each of the products included in the integrated wish list at step S506, and transmits an integrated wish list information, including the retrieved additional payment means and the integrated wish list, to a terminal device at step S508. In this case, the integrated purchase management apparatus 200 may calculate a settlement request amount discounted by applying the additional payment means to a settlement request amount and performing a discount in advance, and may transmit integrated wish list information, including the calculated settlement request amount, the integrated wish list, the additional payment means, and products to which the additional payment means has been applied, to the terminal device.

The terminal device displays the integrated wish list information at step S510 and selects additional payment means that belongs to the additional payment means and that will be used by the corresponding user at step S512. When the user selects payment means information at step S514, the terminal device transmits a settlement request signal, including the additional payment means to be used and the payment means information, to the integrated purchase management apparatus 200 at step S516.

The integrated purchase management apparatus 200 performs a discount in advance by applying the additional payment means to the settlement request amount and performs settlement on the remaining amount using the payment means at step S518.

When the settlement is completed, the integrated purchase management apparatus 200 transmits a settlement completion signal to the terminal device at step S520 and transmits product purchase completion information to a corresponding product selling apparatus at step S522.

The method for an integrated purchase management service described so far in accordance with an embodiment of the present invention may be implemented in the form of a program, application, or a system file for executing the method. An embodiment of the present invention may be implemented in the form of a computer-readable recording medium on which such a program has been recorded.

Furthermore, another aspect of the present invention provides a computer-readable recording medium on which a program for executing the method for an integrated purchase management service when the method is executed by the integrated purchase management apparatus 200 has been recorded. In this case, the method includes collecting wish lists including product information from at least one product selling apparatus, generating the integrated wish list of a corresponding user based on user information included in a collected wish list, obtaining additional payment means that belongs to additional payment means owned by the corresponding user and that is applicable to each of products included in the generated integrated wish list, transmitting integrated wish list information, including the obtained additional payment means and the integrated wish list, to the terminal device of the corresponding user, applying additional payment means, corresponding to additional payment means selection information, to the settlement request amount of the integrated wish list when a settlement request signal including the additional payment means selection information and the payment means is received from the terminal device, and performing settlement on the remaining amount using when payment means.

Such a method for an integrated purchase management service may be written in a program form, and codes and code segments forming the program may be easily reasoned by a programmer of this field. Furthermore, a program regarding the method for an integrated purchase management service may be stored in a medium readable by an electronic device and may be read and executed by an electronic device.

The present invention provides the system and methods for an integrated purchase management service. The present invention is advantageous in that it can reduce an inconvenient procedure for individually paying for a product whenever the product is purchased in an individual online shopping mall because products to be purchased in various online shopping malls are collected by a single integrated purchase management apparatus and are paid at a time.

Furthermore, if products to be purchased in various online shopping malls are collected and to be paid at a time, a user is automatically notified of additional payment means that belongs to additional payment means owned by the user, such as membership points and coupons, and that are applicable to corresponding products. Accordingly, there is an advantage in that a discount in advance can be automatically provided to a user without a need to check additional payment means owned by the user one by one.

Furthermore, there is an advantage in that a user can check wish lists registered with several online shopping malls at a look because the integrated purchase management apparatus integrates and manages the wish lists collected from various selling management apparatuses as integrated wish lists corresponding to respective users.

While some embodiments of the present invention have been described with reference to the accompanying drawings, those skilled in the art to which the present invention pertains will understand that the present invention may be implemented in other various forms without departing from the technical spirit or essential characteristics of the present invention. Accordingly, the aforementioned embodiments should not be construed as being limitative, but should be construed as being only illustrative from all aspects. Furthermore, the scope of the present invention is defined by the appended claims rather than by the detailed description. It should be understood that all modifications or variations derived from the meanings and scope of the present invention and equivalents thereof are included in the scope of the present invention.

What is claimed is:

1. An integrated purchase management apparatus, the apparatus comprising:
   a memory configured to store user information, an additional payment type that a user owns, and an integrated wish list of the user; and
   a processor configured to execute instructions stored in the memory and to:
   collect a wish list comprising product information received from at least one of a product selling apparatus, wherein the product information comprises access information of the product selling apparatus;
   generate the integrated wish list of the user based on user identification information corresponding to the wish list by integrating pieces of product information included in wish lists collected by a plurality of product selling apparatuses;
   update the integrated wish list of the user when the collected wish list includes a new product;
   search the user information corresponding to login information when the user is connected through the terminal device of the user;
   authenticate the user based on the stored user information by comparing a password provided by the terminal device of the user with the user information;
   search the integrated wish list corresponding to the user identification information when the authenticated user is connected to the integrated management apparatus;
   obtain payment type including at least one of a credit card, a check card, or a mobile phone payment;
   obtain an applicable additional payment type by searching the additional payment type stored in the memory to identify whether the applicable additional payment type is eligible for a product included in the integrated wish list, wherein the additional payment type comprises at least one of membership points of the user, or coupons included in the product information;

transmit integrated wish list information to the terminal device of the user, wherein the integrated wish list information comprises the applicable additional payment type and the integrated wish list of the user;

automatically apply the applicable additional payment type to a requested amount, wherein the additional payment type can be applied to the product more than once;

calculate a remaining amount after automatically applying the applicable additional payment to the requested amount;

process payment on the remaining amount using the payment type when a payment request signal is received;

transmit a product purchase completion signal to the product selling apparatus when the payment is processed;

wherein the product selling apparatus is configured to:

provide the product information including price information of the product; and delete the product from the wish list when the product purchase completion signal is received from the settlement processing unit.

2. The integrated purchase management apparatus of claim 1, wherein when any one product of product items included in the integrated wish list is selected and partial settlement is requested by the terminal device, the settlement processing unit selects a partial settlement amount corresponding to the selected product among the settlement request amount, provides the terminal device with a partial settlement menu to perform partial settlement about the selected partial settlement amount and performs partial settlement processing on the selected partial settlement amount when an execution of the partial settlement is requested through the partial settlement menu.

3. A system for integrated purchase management service, the system comprising:

a product selling apparatus configured to:

generate a wish list comprising product information corresponding to at least one product selected by a user based on user information; and transmit the wish list to an integrated purchase management apparatus; and delete the product from the wish list when a product purchase completion signal is received; and the integrated purchase management apparatus configured to:

store user information, an additional payment type that a user owns, and an integrated wish list of the user;

collect a wish list comprising product information received from at least one of the product selling apparatus, wherein the product information comprises access information of the product selling apparatus;

generate the integrated wish list of the user based on user identification information corresponding to the wish list by integrating pieces of product information included in wish lists collected by a plurality of product selling apparatuses;

update the integrated wish list of the user when the collected wish list includes a new product;

search for the user information corresponding to login information when the user is connected through a terminal device of the user;

authenticate the user based on the stored user information by comparing a password provided by the terminal device of the user with the user information;

search for the integrated wish list corresponding to the user identification information when the authenticated user is connected to the integrated purchase management apparatus;

obtain payment type including at least one of a credit card, a check card, or a mobile phone payment;

obtain an applicable additional payment type by searching the additional payment type stored in a memory to identify whether the applicable additional payment type is eligible for a product included in the integrated wish list, wherein the additional payment type comprises at least one of membership points of the user, or coupons included in the product information;

transmit the additional payment type and the integrated wish list to a terminal device;

automatically apply discount to a requested amount with the applicable additional payment type, wherein the additional payment type can be applied to the product more than once;

calculate a remaining amount after automatically applying the applicable additional payment to the requested amount;

determine a payment request amount after applying the discount; transmit integrated wish list information comprising the payment request amount and the integrated wish list to the terminal device;

process payment using the payment type when a payment request signal is received from the terminal device; and transmit the product purchase completion signal to the product selling apparatus when the payment is processed; and the terminal device configured to display integrated wish list information comprising the integrated wish list and the additional payment type.

4. The system of claim 3, wherein, when at least one of the additional payment type is selected in the integrated wish list information, the terminal device is configured to transmit the payment request signal to the integrated purchase management apparatus; and the integrated purchase management apparatus is configured to:

apply the selected additional payment type to a requested amount corresponding to the integrated wish list; and process payment on a remaining amount using the payment type.

5. A method for providing, by an integrated purchase management apparatus, an integrated purchase management service, the method comprising:

storing user information, an additional payment type that a user owns, and an integrated wish list of the user;

collecting a wish list comprising product information received from at least one of a product selling apparatus, wherein the product information comprises access information of the product selling apparatus;

generate the integrated wish list of the user based on user identification information corresponding to the wish list by integrating pieces of product information included in wish lists collected by a plurality of product selling apparatuses;

updating the integrated wish list of the user when the collected wish list includes a new product;

searching for the user information corresponding to login information when the user is connected through a terminal device of the user;

authenticating the user based on the stored user information by comparing a password provided by the terminal device of the user with the user information;

searching for the integrated wish list corresponding to the user identification information when the authenticated user is connected to the integrated purchase management apparatus;

obtaining payment type including at least one of a credit card, a check card, or a mobile phone payment;

obtaining an applicable additional payment type by searching the additional payment type stored in a memory to identify whether the applicable additional payment type is eligible for a product included in the integrated wish list, wherein the additional payment type comprises at least one of membership points of the user or coupons included in the product information;

transmitting integrated wish list information to the terminal device of the user, wherein the integrated wish list information comprises the applicable additional payment type and the integrated wish list of the user;

automatically applying the applicable additional payment type to a requested amount, wherein the additional payment type can be applied to the product more than once;

calculate a remaining amount after automatically applying the applicable additional payment to the requested amount;

processing payment on the remaining amount using the payment type; and when the payment is processed, transmitting a product purchase completion signal to the product selling apparatus, wherein the product selling apparatus is configured to:
provide the product information including price information of the product; and
delete the product from the wish list when the product purchase completion signal is received.

\* \* \* \* \*